United States Patent

Joung

Patent Number: 5,772,869
Date of Patent: Jun. 30, 1998

[54] DATA BACKUP DEVICE FOR WATER PURIFIER

[75] Inventor: Geum-Suk Joung, Suwon, Rep. of Korea

[73] Assignee: Samsung Electronics Co., Ltd., Suwon, Rep. of Korea

[21] Appl. No.: 690,647

[22] Filed: Jul. 29, 1996

[30] Foreign Application Priority Data

Jul. 29, 1995 [KR] Rep. of Korea ...................... 95-23140

[51] Int. Cl.$^6$ .................................... B01D 17/12
[52] U.S. Cl. ...................... 210/149; 210/175; 210/257.1; 222/146.1; 364/479.1
[58] Field of Search ............................ 210/85, 143, 149, 210/175, 248, 257.1, 257.2, 321.6; 222/1, 23, 52, 54, 146.1, 189.06, 189.08, 146.6; 364/502, 479.1; 165/201, 288, 58, 61, DIG. 6, DIG. 2, DIG. 1, 11.1, 287

[56] References Cited

U.S. PATENT DOCUMENTS

| | | | |
|---|---|---|---|
| 4,014,792 | 3/1977 | Gossett et al. ........................ | 210/257.2 |
| 4,792,059 | 12/1988 | Kerner et al. ......................... | 222/146.1 |
| 5,064,097 | 11/1991 | Brog et al. ............................ | 222/146.1 |
| 5,494,573 | 2/1996 | Schoenmeyr et al. ................ | 210/257.2 |
| 5,499,197 | 3/1996 | Fou ........................................ | 210/143 |
| 5,573,142 | 11/1996 | Morellato et al. .................... | 222/146.1 |

FOREIGN PATENT DOCUMENTS

WO 94/20784  9/1994  WIPO ................................ 222/146.1

*Primary Examiner*—Joseph W. Drodge
*Attorney, Agent, or Firm*—Burns, Doane, Swecker & Mathis, L.L.P.

[57] ABSTRACT

A water purifier includes filters for purifying water, hot and cold water tanks for storing hot and cold water, and heating and cooling mechanisms for heating and cooling the stored water. A key input pad enables a user to select desired hot and cold water temperatures. A data backup device includes a memory for storing the selected hot and cold water temperatures, and for immediately storing any changes in the selected temperatures.

2 Claims, 4 Drawing Sheets

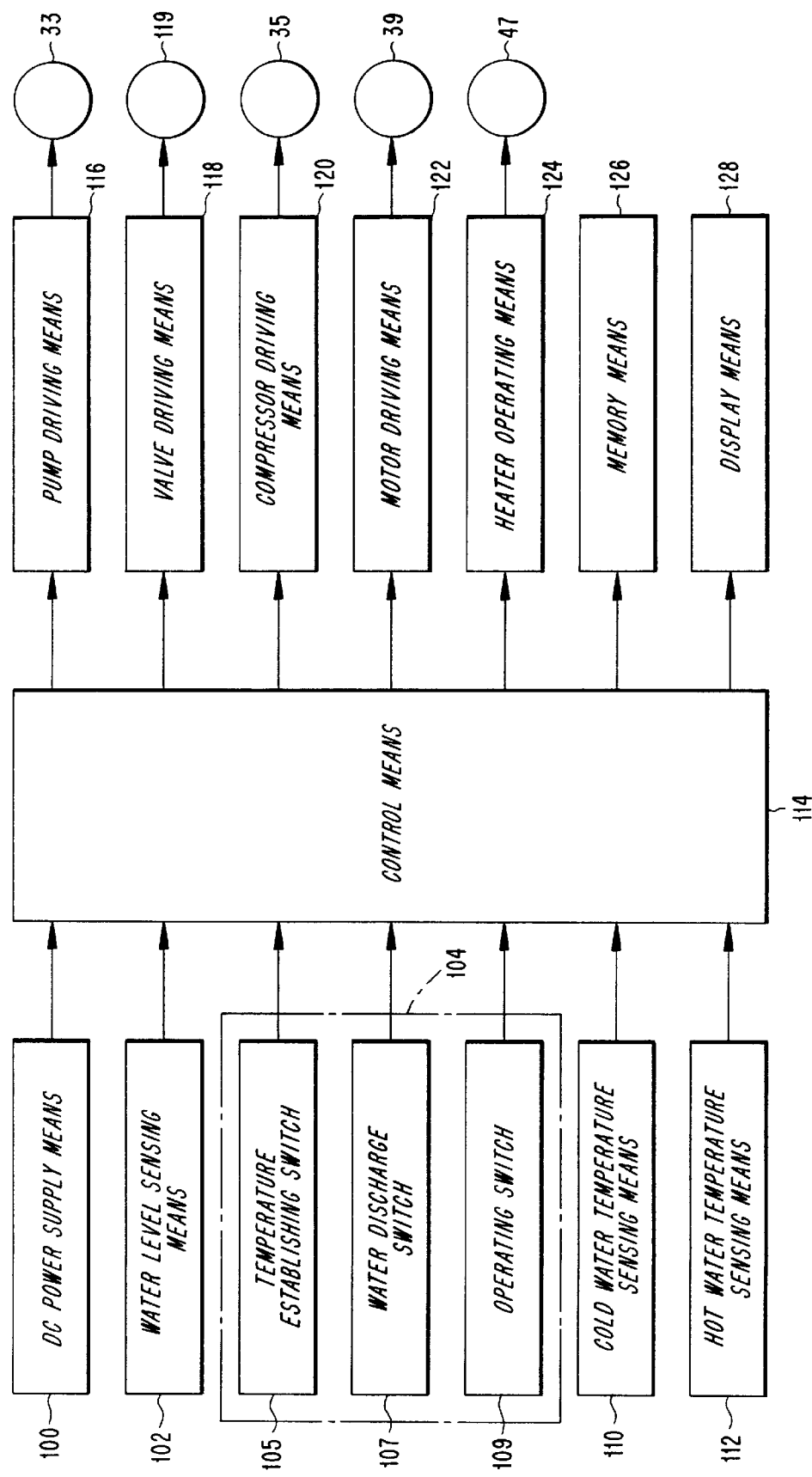

DATA BACKUP DEVICE FOR WATER PURIFIER

BACKGROUND OF THE INVENTION

1. Field of the Invention

The present invention relates to a water purifier for removing noxious pollutant substances contained in fresh water such as tap water to purify the water, and more particularly to a data backup device for such a water purifier, for storing the operation state of the water purifier when external power is cut off.

2. Description of the Prior Art

Typically, water purifiers are used to remove noxious pollutant substances contained in fresh water such as tap water, in order to supply purified water. They are classified into a natural filtering type, a forced filtering type, an ion exchanging resin type and a reverse osmotic type in accordance with the methods for purifying water.

Water purifiers of the reverse osmotic type, which force fresh water to pass through an artificial osmotic membrane (reverse osmotic filter) while applying pressure to the fresh water, can remove heavy metals, bacteria, cancer-causing materials and the like contained in the water, thereby purifying the water. Since the reverse osmotic water purifiers can supply pure water containing only dissolved oxygen, they have been used in fields such as super-pioneering scientific industry, medical science or cleaning for super-precise electronic elements.

Recently, such reverse osmotic water purifiers have widely been used as domestic water purifiers for supplying drinkable water.

The conventional water purifiers serve to remove noxious substances to humans, such as heavy metals, bacteria, cancer-causing materials contained in fresh water such as tap water by a plurality of filters.

The water purified by the filters is stored in a water tank, a cold water tank, and a hot water tank, respectively, to thereby be discharged through a discharge port by manipulating a water discharge lever.

Meanwhile, it is necessary to maintain the operation state of the water purifier, such as cold water establishing temperature, hot water establishing temperature and on/off state when an power source voltage is momentarily, cut off or interrupted.

Accordingly, in the conventional water purifier, a microcomputer determines whether or not the external source voltage is below a predetermined reference voltage.

As a result, when the external source voltage is below the predetermined reference voltage, the present operation state of the water purifier is stored in the memory which memory is operated by a backup battery.

In such a conventional water purifier using the backup battery however, since a capacity of the backup battery is proportional to a storing time for data, the capacity of the backup battery must become large, and the manufacturing cost thereof rises.

Further, the backup battery is entirely discharged if the backup battery is not used for a long time.

SUMMARY OF THE INVENTION

Accordingly, an object of the invention is to solve the above-mentioned problems and to provide a data backup device for a water purifier, capable of safely storing newly established temperatures in a memory, thereby keeping the operating state of the water purifier even when an external source voltage is cut off being supplied to the water purifier.

In accordance with the present invention, this object is accomplished by providing in a water purifier including a plurality of filtering means for removing various harmful organic chemical substances, heavy metals, bacteria, cancer-causing materials and odorous substances, a water tank for storing purified water, cooling means for cooling said purified water, heating means for heating said purified water, a cold water tank for storing cold water cooled by said cooling means, and a hot water tank for storing hot water heated by said heating means, a data backup device comprising:

key input means including a plurality of keys for establishing temperatures of cold water and hot water according to user's desire, simultaneously for establishing operation conditions of the water purifier;

control means for controlling the cooling and heating operations of purified water in the cold water tank and the hot water tank according to established temperatures by manipulating a temperature establishing switch of the key input means, for controlling overall operation of the water purifier;

memory means for storing the operating conditions, the established temperatures of cold water and hot water by the key input means, for immediately storing the newly established temperatures when the temperatures are changed by the key input means; and display means for displaying the established temperatures by the key input means and for displaying the temperatures of cold water in the cold water tank and hot water in the hot water tank, respectively, under a control of the control means.

BRIEF DESCRIPTION OF THE DRAWINGS

Other objects and aspects of the invention will become apparent from the following description of embodiments with reference to the accompanying drawing in which;

FIG. 3 is a block diagram illustrating the data backup device according to the present invention.

DETAILED DESCRIPTION OF THE PREFERRED EMBODIMENTS

Figure 1:
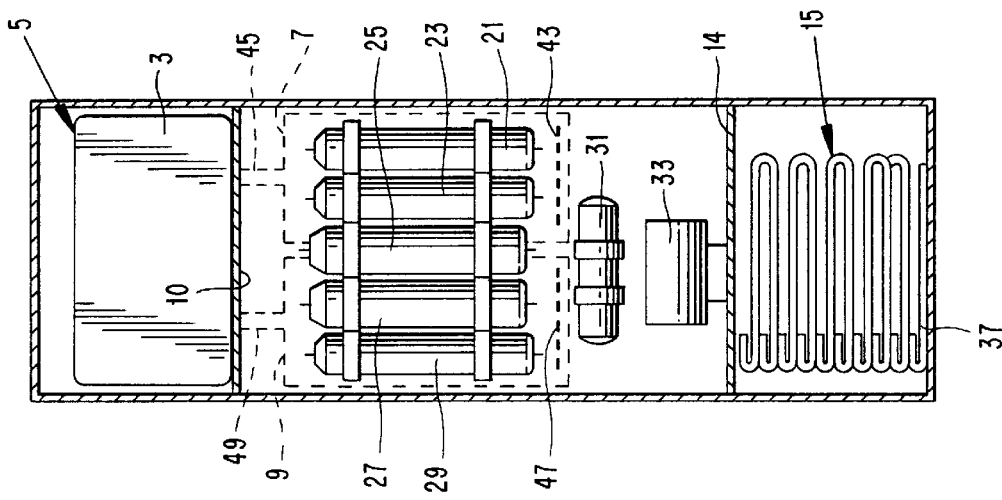
FIG. 1 is a longitudinal sectional view of a water purifier to which a data backup device according to an embodiment of the present invention is applied.
Figure 2:
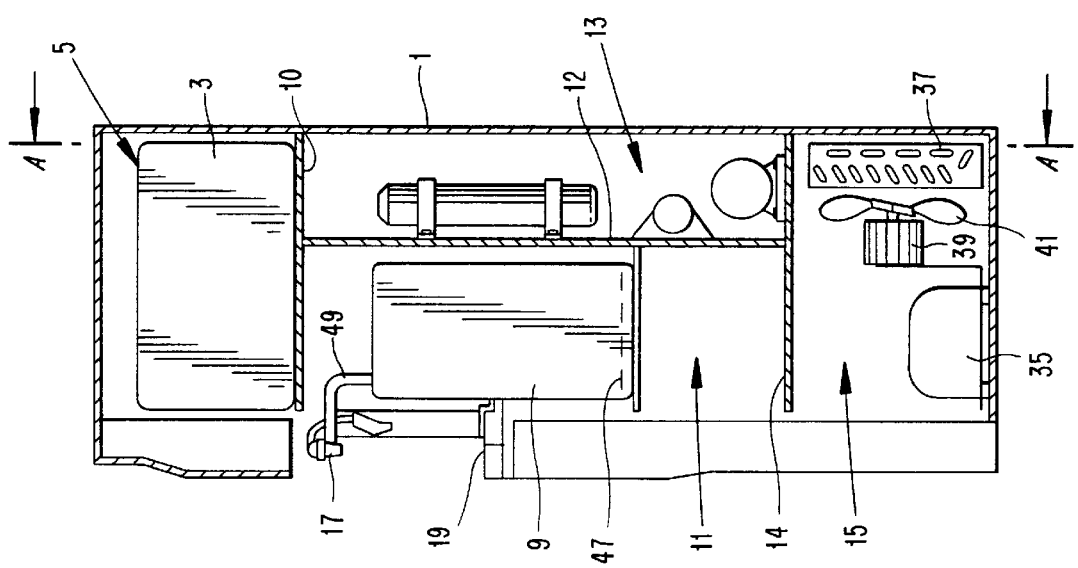
FIG. 2 is a sectional view taken along lines A—A shown in FIG. 1.

In FIG. 1 and FIG. 2, a water purifier according to the present invention comprises a water purifying chamber 5 formed at upper side of a purifier body 1 for receiving a water tank 3 for storing the purified water.

At a lower side of the water purifying chamber 5, a cold water and hot water chamber 11 is disposed which includes a cold water tank 7 and a hot water tank 9 serving to store cold water and hot water that has been subjected to heating and cooling by heating means and cooling means.

The water purifier further comprises a filtering chamber 13 for filtering noxious pollutant substances contained in fresh water supplied from a faucet, a machine chamber 15 housing a refrigerant cycle mechanism so that the purified water in the cold water tank 7 is cooled, and a water discharge lever 17 disposed at the front side of the body 1 in order to cause cold water or hot water in the cold water tank 7 or hot water tank 9 to be discharged outside.

Inside the filtering chamber 13, a precipitation filter 21 is disposed to remove noxious pollutant substances and rust substances contained in the fresh water supplied from the faucet.

At one side of the precipitation filter 21, a pre-processing filter 23 is disposed to remove various harmful organic chemical substances and the like from the fresh water supplied from the precipitation filter 21.

At one side of the pre-processing filter 23, membrane filters 25 and 27 are disposed which includes a plurality of membranes (not shown), serving to remove heavy metals, bacteria, cancer-causing materials and the like contained in the water emerging from the pre-processing filter 23.

A post-processing filter 29 is connected to the membrane filters 25 and 27 to remove odorous substances, such as noxious gas, contained in the water emerging from the membrane filters 25 and 27.

At a lower side of the precipitation filter 21, the pre-processing filter 23, the membrane filters 25 and 27, and post-processing filter 29, an ultraviolet filter 31 is disposed to remove various harmful germs contained in the fresh water when the fresh water is passed through a plurality of filters.

A pressure pump 33 is connected between the pre-processing filter 23 and the membrane filters 25 and 27 to apply pressure to the water emerging from the pre-processing filter 23, thereby feeding the water to the membrane filters 25 and 27 at a certain pressure.

Since water under pressure is fed to the membrane filters 25 and 27 by the pressure pump 33, it can be purified by the membrane filters 25 and 27 in a reverse osmotic manner.

Inside the machine chamber 15, a compressor 35 is disposed to compress gas refrigerant of low temperature and low pressure into gas refrigerant of high temperature and high pressure.

At one side of the compressor 35, a condenser 37 is disposed to condense the gas refrigerant of high temperature and high pressure into liquid refrigerant of low temperature and high pressure.

The liquid refrigerant is produced by heat exchange between the gas refrigerant of high temperature and high pressure and outside air due to natural convention current or forced convention current.

At one side of the condenser 37, a fan 41 is disposed to be driven by of a fan motor 39 so that the refrigerant is liquefied, and, at the same time the compressor 35 is cooled due to the air circulation.

Meanwhile, inside the cold water tank 7 an evaporation tube 43 is disposed to cause the refrigerant flowing therein to be evaporated so that the water in the cold water tank 7 is cooled.

A water discharge pipe 45 is connected to one side of the cold water tank 7 to discharge cold water.

Inside the hot water tank 9, a heater 47 is disposed to heat the water in the hot water tank 9.

Another water discharge pipe 49 is connected to one side of the hot water tank 9 to discharge hot water.

The water purifying chamber 5, the cold water and hot water chamber 11, the filtering chamber 13 and the machine chamber 15 are partitioned by partition members 10, 12 and 14.

Numeral 19 denotes a waterspout, which is disposed at a lower side of the water discharge lever 17, to store water dispersing when discharging the water according to operating the water discharge lever 17.

FIG. 3 is a block diagram illustrating a data backup device according to the present invention.

In FIG. 3, the data pickup device includes a DC power supply means 100 for converting a source voltage from a commercial AC power source, input at an AC power input stage (not shown), into a DC voltage with a voltage level required to drive the water purifier.

The data backup device also includes water level sensing means 65 for sensing the amount of water level of the water tank 3.

The water level sensing means 102 comprises water level sensors which sense the full and empty water levels of the water tank 3, respectively.

Key input means 104 enable a user to establish data necessary to operates the water purifier.

The key input means 104 comprises a temperature establishing switch for establishing temperatures Tcs and Ths of the cold water and the respectively to be stored in the cold water tank 7 and the hot water tank 9, a water discharge switch 107 for discharging the water in the water tank 3, the cold water tank 7 and the hot water tank 9, and an operating switch 108 for supplying or interrupting a power source to the water purifier.

The DC power supply means 100, the water level sensing means 102 and the key input means 104 are all coupled to control means 114.

This control means 114 serves to receive the DC voltage from the DC power supply means 100 and to initialize the water purifier in response to the DC voltage.

The control means 114 also receives a water level sensing signal from the water level sensing means 102 and controls the overall water purifying operation of the water purifier on the basis of the water level sensing signal.

This control means also controls the temperatures of the cold water and hot water in the cold water tank 7 and the hot water tank 9 to be increased or be lowered to the user's desired temperatures, and controls the water discharging operation.

The control means 114 is a microcomputer.

Cold water temperature sensing means 110 serves to sense the temperature Tc of the cold water in the tank 7 and outputs it to the control means 114.

Warm water temperature sensing means 112 serves to sense the temperature Th of the hot water in the tank 9 and outputs it to the control means 114.

To the control means 114, pump driving means 116 is coupled which controls the pressure pump 33, which increases the pressure of water being introduced in the membrane filters 25 and 27 to a certain level, under a control of the control means 114.

The pump driving means 116 receives a control signal from the control means 114 generated in accordance with the water level sensed by the water level sensing means 102.

In accordance with that control signal, the pump driving means 116 drives or stops the pressure pump 33.

Valve driving means 118 is also coupled to the control means 114 to control a water supply valve 119.

The valve driving means 118 receives a control signal which is generated from the control means 114 in accordance with the water level of the water tank 3 sensed by the water level sensing means 102.

In accordance with the control signal, the valve driving means 118 controls the water supply valve 119 to control the supply of purified water to the water tank 3.

Compressor driving means 120 controls the compressor 35.

The compressor driving means 120 receives a control signal which is generated from the control means in accordance with a difference between the temperature Tcs which is established by the temperature establishing switch 105 of the key input means 104 and the temperature Tc of the cold water which is sensed by the cold water temperature sensing means 110.

In accordance with the control signal, the compressor driving means 120 controls the compressor 35 to control the cooling of the water in the tank 7.

The data backup device further includes motor driving means 122 to control the fan motor 39.

The motor driving means 122 receives a control signal which is generated from the control means 114 in accordance with a difference between the temperature Tcs which is established by the temperature establishing switch 105 of the key input means 104 and the temperature Tc of the cold water which is sensed by the cold water sensing means 110.

In accordance with the control signal, the motor driving means 122 controls the motor 39 to control the operation of the fan 41 Therefore, a heat-exchanged air at the condenser 37 is discharged outside, and simultaneously the compressor 35 is cooled due to the operation of the fan 41.

Heater operating means 124 is also coupled to the control means 114 to control the heater 47.

The heater operating means 124 receives a control signal which is generated from the control means 114 in accordance with a difference the temperature Ths which is established by the temperature establishing switch 105 of the key input means 104 and the temperature Th of the hot water which is sensed by the hot water temperature sensing means 112.

In accordance with the control signal, the heater operating means 124 controls the heater 47 to heat the water in the tank 9.

Memory means 126 is also coupled to the control means 114.

The memory means 126 stores the temperatures Tcs and Ths which are established by the temperature establishing switch 105 of the key input means 104, or newly established temperatures Tcs and Ths which are changed by the temperature establishing switch 105.

The memory means 126 also stores the on/off state of the operating switch 109 of the key input means 104, and the on/off state of the water discharge switch 107.

The memory means 126 is a EEPROM.

The data backup device further includes display means 128 which receives various control signals generated from the control means 114 and displays the operation conditions respectively corresponding to the received control signals, such as, the temperatures Tcs and Ths which are established by the temperature establishing means 105 of the key input means 104, the temperatures Tc and Th which are sensed by the cold water temperature sensing means 110 and the hot water temperature sensing means 113, respectively.

Meanwhile, the temperatures Tcs and Ths, which are established by the temperature establishing switch 105, are stored in the memory means 126 when the display means 128 displays the temperatures Tc and Th.

Figure 4A:
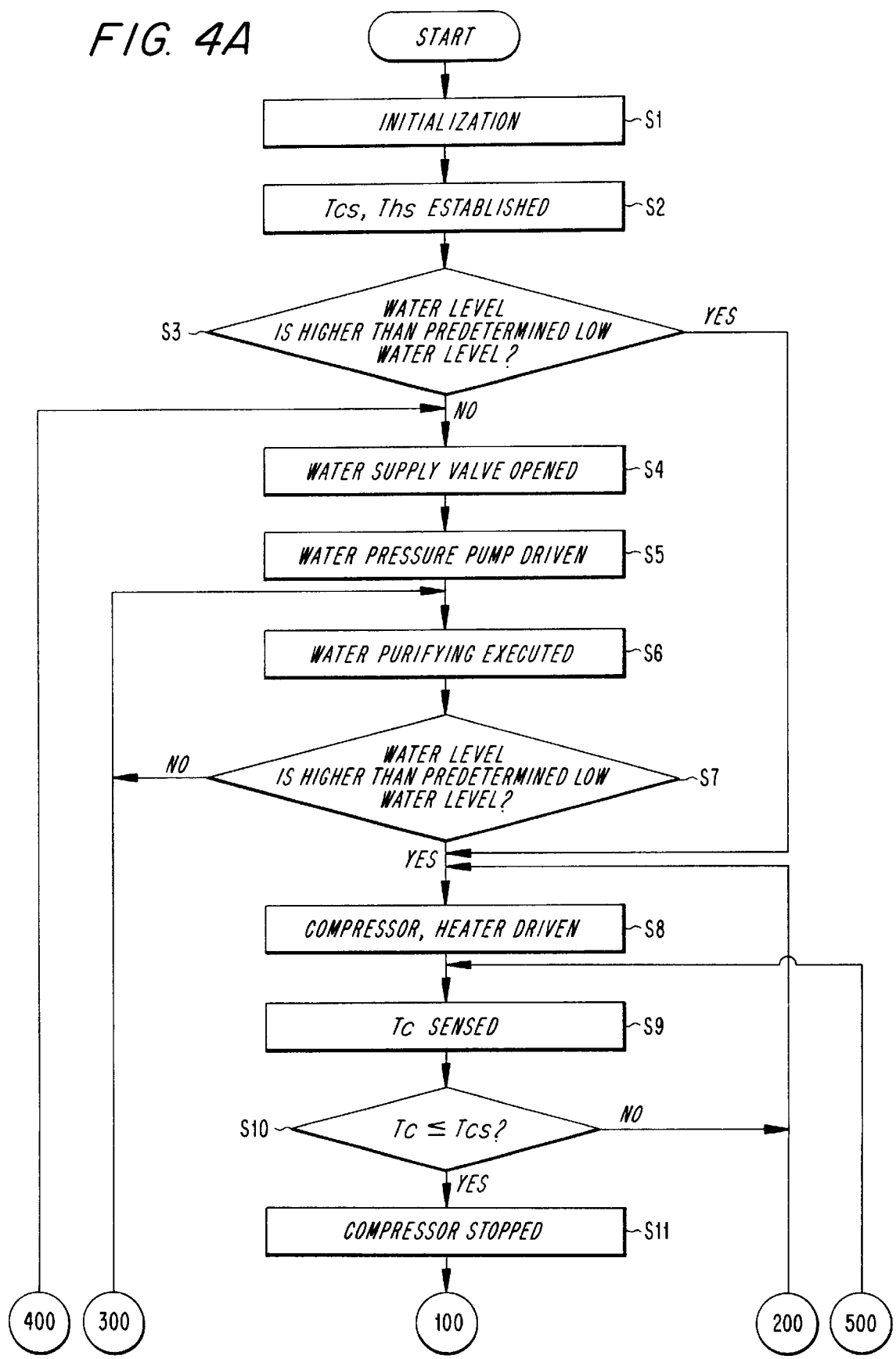
FIGS. 4A and 4B are flow charts respectively illustrating the sequence of the data backup procedure executed by the data backup device according to the present invention.
Figure 4B:
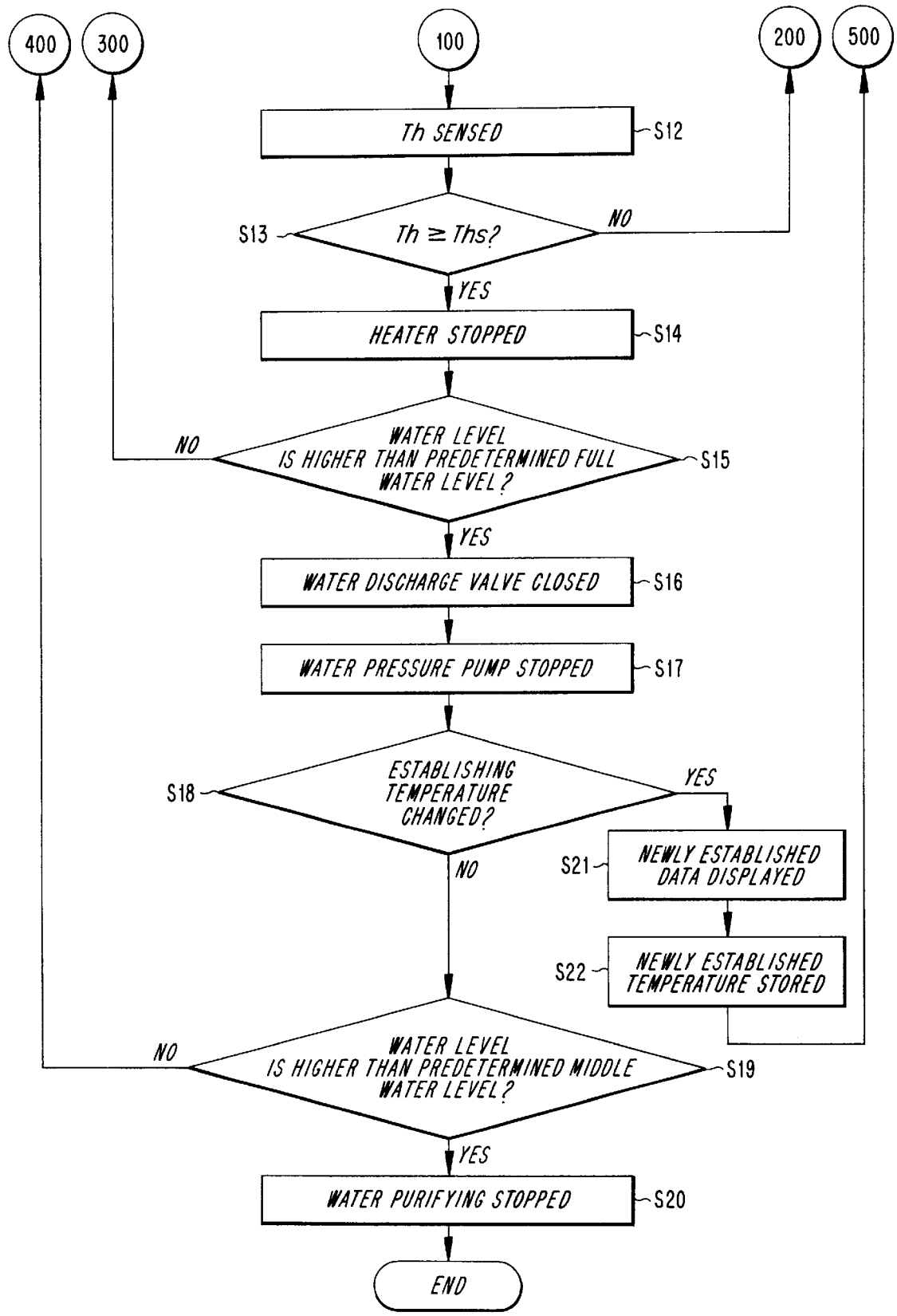

The operation of the data backup device having the above-mentioned construction will now be described in conjunction with FIGS. 4A and 4B.

FIGS. A and 4B are flow charts respectively illustrating the sequence of the data backup procedure executed by the data backup device according to the present invention.

Once the water purifier is powered, the DC power supply means 100 converts a source voltage received from a commercial AC power source at its AC power input stage (not shown) into a DC voltage with a voltage level required to drive the water purifier.

The DC voltage from the DC power supply means 100 is then applied to the control means 114 as well as to various driving circuits.

Upon receiving the DC voltage from the DC power supply means 100, the control means 114 initializes the water purifier at atep S1.

At step S2, a user presses a cold water selection switch or a hot water selection switch (not shown) of the key input means 104 to thereby select cold water or hot water.

The user further presses the temperature establishing switch 105 to establish the user's desired cold water temperature Tcs and hot water temperature Ths.

The display means 128 displays the temperatures Tcs and Ths under the control of the control means 114.

At this time, the temperatures Tcs and Ths are stored in the memory means 126 at the time of being changed to cold water temperature Tc and hot water temperature Th from the temperature Tcs and Ths.

Subsequently, the operating switch 109 is turned on, and the water level sensing means 102 senses the amount of water stored in the water tank 3, namely the water level of the water tank 3.

Water level data from the water level sensing means 102 is sent to the control means 114.

It is then determined at step S3 whether or not the water level of the water tank 3 sensed by the water level sensing means 102 is higher than a predetermined low water level (about 10%, if full water level is 100%).

This determination is achieved by the control means 114 which receives a signal sensed by the empty water level sensor mounted at the inner surface of the water tank 3 and then discriminates on the basis of the received signal, whether or not the water level of the water tank 3 is higher than the predetermined low water lever.

When the water level of the water tank 3 is determined at step S3 as not being higher than the predetermined low water level (namely, if NO), the procedure proceeds to step S4.

At step S4, the control means 114 applies, to the valve driving means 118, a control signal for opening the water supply valve 81 to supply purified water to the water tank 3.

Therefore, the valve driving means 118 supplies the source voltage to the water supply valve 81 under the control of the control means 114, thereby opening the water supply valve 81.

When the water supply valve is opened 81, fresh water, such as tap water, from the faucet is supplied to the filters.

At this time, the control means 114 outputs a control signal to the pump driving means 116 to drive the pressure pump 33.

Accordingly, the pump driving means 116 supplies the source voltage to the preassure pump 33 under the control of the control means 114, thereby driving the pressure pump 33.

According to driving the pressure pump 33 the pressure of fresh water sent merging to the membranes 25 and 27 from the pre-processing filter reaches a predetermined pressure.

At step S6, the precipitation filter 21 removes noxious pollutant substances and rust substances contained in fresh water supplied from the faucet, and the pre-processing filter 23 removes various harmful organic chemical substances such as chlorine components and the like from fresh water supplied from the precipitation filter 21.

Further, the membrane filters 25 and 27 remove heavy metals, bacteria, cancer-causing materials and the like contained in the water emerging from the pre-processing filter 23, and the post-processing filter 29 removes odorous substances, such a noxious gas, contained in the water emerging from the membrane filters 25 and 27.

The fresh water emerging from the post-processing filter 29 is supplied to the water tank 3 through the water supply inlet (not shown) to thereafter be supplied to the cold water tank 7 and the hot water tank 9.

Meanwhile, the ultraviolet filter 31 emits ultraviolet toward the fresh water when the fresh water travels to the precipitation filter 21, the pre-processing filter 23, the membranes 25 and 27, and post-processing filter 29.

Therefore, it is possible to remove various harmful germs such as bacteria and the like contained in the fresh water.

At step S7, the water level sensing means 102 senses the amount of water stored in the water tank 3.

Water level data from the water level sensing means 102 is sent to the control means 114.

It is then determined whether or not the water level of the water tank 3 sensed by the water level sensing means 102 is higher than the predetermined low water level.

When the water level of the water tank 3 is determined as not being higher than the predetermined low water level (namely, if NO), the procedure returns to step S6 to repeat the supply of the purified water.

On the other hand, where the water level of the water tank 3 is determined at step S7 as being higher than the predetermined low water level (namely, if YES), the procedure proceeds to step S8.

At step S8, the control means 114 applies control signals to the compressor driving means 120, the heater operating means 124 and the motor driving means 122 to control the compressor 35, the heater 47, and the fan motor 39.

In accordance with the control signals from the control means 114, the compressor driving means 120 drives the compressor 35, the heater operating means 124 operate s the heater 47, and the motor driving means 122 drives the fan motor 39.

Therefore, refrigerant gas of high pressure and high temperature discharged out of the compressor 35 is cooled and liquefied in the condenser 37 to thereafter be heat-exchanged with room air by natural convection current or forced convection current by rotating the fan 41, and the liquefied refrigerant of high pressure and low temperature is in turn infused into a capillary tube (not shown).

As a result, the refrigerant liquid of high pressure and low temperature is converted into the liquid of low pressure and low temperature by an adiabetic expansion effect to thereby be infused into an evaporating tube 43. At this time, the refrigerant liquid of low pressure and low temperature is converted to refrigerant gas in the evaporating tube 43 and heat exchanged with the room air, thereby cooling purified water in the cold water tank 9.

The refrigerant liquid of low temperature and low pressure is converted to refrigerant gas in the evaporating tube 43 to thereafter be introduced into the compressor 35. Thereafter, the refrigerant gas is converted to refrigerant gas of high temperature and high pressure to thereafter repeat a cooling cycle thus described.

Meanwhile, when the heater 47 is operated, purified water in the hot water tank 9 is converted to hot water.

The water purifying operation of the water purifier is executed until the water level in the water tank 3 reaches a full water level even while purified water is cooled and heated.

At step S9, the cold water temperature sensing means 110 senses the temperature Tc of the cold water in the cold water tank 7.

Temperature data of the cold water from the cold water temperature sensing means 110 is sent to the control means 114. At this time, the display means 128 displays the temperature Tc sensed by the cold water temperature sensing means 110 under the control of the control means 114.

Thereafter, at step S10, it is determined whether or not the temperature Tc sensed by the cold water temperature sensing means 110 is lower than the established temperature Tcs established by the temperature establishing switch 105. As a result, where the temperature Tc of the cold water is determined as not being lower than the established temperature Tcs (namely, if NO), the procedure returns to step S8 to repeat the procedure from step S8.

Accordingly, the compressor driving means 120 drives the compressor 35, and at the same time, the motor driving means 122 drives the fan motor 39 to continuously be cooled the cold water in the cold water tank 7.

On the other hand, when the temperature Tc of the cold water is determined at step S10 as being lower than the established temperature Tcs (namely, if YES), the procedure proceeds to step S11.

At step S11, the control means 114 applies control signals to the compressor driving means 120 and the motor driving means 122 to stop the compressor 35 and the fan motor 39.

In accordance with the control signals from the control means 114, the compressor driving means 120 stops the driving of the compressor 35, and the motor driving means 122 stops the driving of the fan motor 39. Therefore, the cold water in the cold water tank 7 is no longer cooled.

At step S12, the hot water temperature sensing means 112 senses the temperature Th of the hot water in the hot water tank 9. Temperature data from the hot water temperature sensing means 112 is sent to the control means 114. The display means 128 displays the temperature Th of the hot water sensed by the hot water temperature sensing means 112 under the control of the control means 114.

It is then determined at step S13 whether or not the temperature Th of the water water sensed by the hot water temperature sensing means 112 is higher than the established temperature Ths established by the temperature establishing means 105.

When the temperature Th of the hot water is determined as not being higher than the established temperature Ths (namely, if NO), the procedure returns to step S8 and repeatedly executes the procedure from step S8 until the temperature Th of the hot water in the hot water tank 9 is higher than the established temperature Ths.

On the other hand, when the temperature Th of the hot water is determined at step S13 as being higher than the established temperature Ths (namely, if YES), the procedure proceeds to step S14.

At step S14, the control means 114 applies a control signal to the heater operating means 124 to stop the operating of the heater 47.

In accordance with the control signal from the control means 114, the heater operating means 124 cuts off the source voltage being applied to the heater 47, to thereby stop the heater 47.

Subsequently, at step S15, the water level sensing means 102 senses the amount of water stored in the water tank 3, namely whether the water level of the water tank 3 was changed during the production of cold water and hot water.

Water level data from the water level sensing means 102 is sent to the control means 114.

It is then determined at step S15 whether or not the water level of the water tank 3 sensed by the water level sensing means 102 is higher than a predetermined full water level.

As a result, when the water level of the water tank 3 is determined as not being higher than the predetermined full water level (namely, if NO), the procedure returns to step S6 and repeatedly executes the procedure from step S6 until the water level of the water tank 3 is higher than the predetermined full water level.

On the other hand, when the water level of the water tank 3 is determined at step S15 as being high than the predetermined full water level (namely, if YES), the procedure proceeds to step S16.

At step S16, the control means 114 applies a control signal to the valve driving means 118 to close the water supply valve 81.

In accordance with the control signal from the control means 114, the valve driving means 118 cuts off the source voltage being applied to the water supply valve 81, thereby closing the water supply valve 81.

Subsequently, at step S17, the control means 114 applies a control signal to the pump driving means 116 to stop the pressure pump 33.

In accordance with the control signal from the control means 114, the pump driving means 116 cuts off the source voltage being applied to the pressure pump 33, thereby stopping the pressure pump 33.

In the closed state of the water supply valve 81, the supply of fresh water from the faucet to the water supply pipe is cut off. As a result, purified water is no longer supplied to the water tank 3.

Thus, the water purifying operation is completed.

Subsequently, the water purifying operation of the water purifier is executed at step S18.

That is, it is determined whether or not the established temperatures Tcs and Ths have been changed by a manipulation of the temperature establishing switch 105 so that temperatures of the cold water in the cold water tank 7 and the hot water in the hot water tank 9 must be changed.

When the established temperatures Tcs and Ths are determined at step S18 as not having been changed (namely, if NO), the procedure proceeds to step S19.

At step S19, the water level sensing means 102 senses the amount of water stored in the water tank 3, namely the water level of the water tank 3.

Water level data from the water level sensing means 102 is sent to the control means 114.

It is then determined at step S19 whether or not the water level of the water tank 3 sensed by the water level sensing means 102 is higher than a predetermined middle water level.

As a result, when the water level of the water tank 3 is determined at step S19 as not being higher than the predetermined middle water level (namely, if NO), the procedure returns to step S4 and repeatedly executes the procedure from the step S4 until the water level of the water tank 3 is higher than the predetermined middle water level.

On the other hand, when the water level of the water tank 3 is determined at step S19 as being higher than the predetermined middle water level (namely, if YES), the control means 114 applies, to the valve driving means 118, a control signal for closing the water supply valve 81 thereby stopping the supply of purified water to the water tank 3 at step S20.

Therefore, the valve driving means 118 cuts off the source voltage being applied to the water supply valve 81.

In the closed state of the water supply valve 81, the supply of fresh water from the faucet to the water supply pipe is cut off. As a result, purified water is no longer supplied to the water tank 3.

Thus, the water purifying operation is completed.

Meanwhile, when the temperatures Tcs and Ths are determined at step S18 as having been changed (namely, if YES), the procedure proceeds to step S21.

At step S21, the control means 114 applies a control signal to the display means 128 to display the newly established temperature Tcs and Ths.

Subsequently, at step S22, the temperatures Tcs and Ths newly established by manipulating the temperature establishing switch 105 are stored in the memory means 126 when the display means 128 displays the present temperatures Tc and Th of the cold water and the hot water in the cold water tank and the hot water tank, respectively. Thereafter, the procedure returns to step S9 and repeatedly executes the procedure from step S9.

As set forth in the foregoing description, when the temperatures Tcs and Ths are changed by manipulating the temperature establishing switch 105, the newly established temperatures Tcs and Ths are immediately stored in the memory means 126 under the control of the control means 114.

Therefore, data corresponding to the newly established temperatures Tcs and Ths is safely stored in the memory means 126 in the event that the external source voltage is cut off.

The water purifier later executes the water purifying operation on the basis of the stored data in the memory means 126 when the external source voltage is restored.

Meanwhile, after executing step S22 the procedure returns to step S9 and repeatedly executes the procedure from step S9.

This prevents additional heating and cooling steps from occuring if the temperature Tc of the cold water in the cold water tank 7 is now lower than the newly established temperature Tcs and the temperature Th of the hot water in the hot water tank 9 is now higher than the newly established temperature Ths.

Further, at step S3, when the water level in the water tank 3 sensed by the water level sensing means 102 is determined as being higher than the predetermined low water level (namely, if YES), the procedure directly proceeds to step S8.

At step S8, the control means 114 applies, to the compressor driving means 120 and the heater operating means 124, control signals.

In accordance with the control signals, the compressor driving means 120 drives the compressor to cool the water in the cold water tank 7, and at the same time, the heater operating means 124 operates the heater 47 to heat the water in the hot water tank 9.

Thereafter, the procedure executes from step S9.

The present invention is not limited in application to the backup storing of the newly established temperatures in the memory means 126, it is possible to apply to the memory, the on/off condition of the operating switch 109, the on/off condition of the water discharge switch 107, and cold water and hot water selection conditions.

As apparent from the above description, the present invention provides a data backup device for a water purifier, capable of immediately storing the newly established temperatures in the memory means, to thereby maintain the present operating state of the water purifier without providing a battery for backup.

Having described specific preferred embodiment of the invention with reference to the accompanying drawings, it is to be understood that various changes and modifications may be effected therein by one skilled in the art without departing from the scope or spirit of the invention as defined in the appended claims.

What is claimed is:

1. A water purifier comprising:

a filter for purifying water;

a main water tank for storing purified water;

cold and hot water tanks connected to the main tank for receiving and storing purified water therefrom;

cooling means for cooling the purified water in the cold water tank;

heating means for heating the purified water in the hot water tank;

key input means connected to the cooling and heating means and including manually actuable keys for selecting desired hot and cold water temperatures for the cold and hot water tanks, respectively;

sensing means for sensing the actual temperatures of the water stored in the cold and hot water tanks;

a display device connected to the key input means and sensing means for displaying the selected hot and cold water temperatures, and the actual hot and cold water temperatures in the hot and cold water tanks; and data backup means including a memory connected to the key input means for storing the selected hot and cold water temperatures and for immediately storing any changes in the selected hot and cold water temperatures.

2. The water purifier according to claim 1 wherein the memory comprises EEPROM.

* * * * *